United States Patent
Koike et al.

(10) Patent No.: US 9,469,001 B2
(45) Date of Patent: Oct. 18, 2016

(54) MACHINE TOOL

(75) Inventors: Shinji Koike, Aiko-gun (JP); Kazuya Mayumi, Aiko-gun (JP); Satoshi Kobayashi, Aiko-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 6 days.

(21) Appl. No.: 14/409,776

(22) PCT Filed: Jun. 25, 2012

(86) PCT No.: PCT/JP2012/066181
§ 371 (c)(1),
(2), (4) Date: Dec. 19, 2014

(87) PCT Pub. No.: WO2014/002171
PCT Pub. Date: Jan. 3, 2014

(65) Prior Publication Data
US 2015/0336230 A1    Nov. 26, 2015

(51) Int. Cl.
*B23Q 1/01* (2006.01)
*B23C 1/027* (2006.01)
(Continued)

(52) U.S. Cl.
CPC .............. *B23Q 1/015* (2013.01); *B23Q 1/017* (2013.01); *B23Q 11/0053* (2013.01); *B23C 1/027* (2013.01); *B23C 2230/00* (2013.01); *B23Q 1/70* (2013.01); *B23Q 11/0042* (2013.01); *B23Q 11/0067* (2013.01); *Y02P 70/171* (2015.11); *Y10T 409/30392* (2015.01); *Y10T 409/304088* (2015.01)

(58) Field of Classification Search
CPC .......... B23Q 11/0067; B23Q 11/0042; B23Q 11/0053; B23Q 1/01; B23Q 1/015; B23Q 1/017; B23Q 1/70; B23C 2230/00
See application file for complete search history.

(56) References Cited

U.S. PATENT DOCUMENTS

| | | | | |
|---|---|---|---|---|
| 3,511,129 A | * | 5/1970 | Muller | B23Q 1/015 409/137 |
| 4,955,770 A | | 9/1990 | Kitamura | |
| 5,611,137 A | * | 3/1997 | Braun | B23Q 1/017 29/26 A |

(Continued)

FOREIGN PATENT DOCUMENTS

| | | |
|---|---|---|
| GB | 1 203 877 | 9/1970 |
| JP | 6-226583 | 8/1994 |

(Continued)

OTHER PUBLICATIONS

International Search Report mailed Aug. 7, 2012, directed to International Application No. PCT/JP2012/066181; 2 pages.

*Primary Examiner* — Daniel Howell
*Assistant Examiner* — Yasir Diab
(74) *Attorney, Agent, or Firm* — Morrison & Foerster LLP

(57) ABSTRACT

A machine tool includes: a bed, the upper surface of which has the table provided thereon; a cut debris duct which is provided so as to extend rearward from a cut debris discharge opening open at the center, in the left-right direction, of the rear face of the bed, and which discharges cut debris from within the bed to outside of the machine tool; a bifurcated vertically movable body which vertically moves along a pair of vertical guides, and which straddles the cut debris duct, the pair of vertical guides vertically extending on the rear face of the bed at positions on both the left and right sides of the cut debris duct; and a pair of left and right feed screws which extend parallel to the vertical guides, and which move the vertically movable body along the vertical guides.

4 Claims, 3 Drawing Sheets

(51) Int. Cl.
*B23Q 1/70* (2006.01)
*B23Q 11/00* (2006.01)

(56) References Cited

U.S. PATENT DOCUMENTS

| | | | |
|---|---|---|---|
| 6,641,341 B2 | 11/2003 | Sato et al. | |
| 7,189,194 B1 | 3/2007 | Takayama et al. | |
| 7,527,460 B2* | 5/2009 | Gueli | B23Q 1/01 408/234 |
| 2003/0126728 A1* | 7/2003 | Watanabe | B23Q 1/262 29/48.5 R |
| 2003/0190206 A1* | 10/2003 | Sugata | B23Q 1/015 409/235 |
| 2011/0070044 A1* | 3/2011 | Kawada | B23Q 1/015 409/162 |
| 2012/0020755 A1 | 1/2012 | Hiroshima et al. | |

FOREIGN PATENT DOCUMENTS

| | | |
|---|---|---|
| JP | 2002-326137 | 11/2002 |
| JP | 3697697 | 7/2005 |
| JP | 2007-75926 | 3/2007 |

\* cited by examiner

MACHINE TOOL

CROSS REFERENCE TO RELATED APPLICATIONS

This application is a U.S. National Phase patent application of PCT/JP2012/066181, filed on Jun. 25, 2012, which is hereby incorporated by reference in the present disclosure in its entirety.

FIELD OF THE INVENTION

The invention relates to a machine tool for processing a workpiece by moving a tool attached to a spindle and the workpiece attached to a table relative to each other.

BACKGROUND OF THE INVENTION

Generally, in machine tools, there are various types of configuration for relatively moving a spindle and a table in X-, Y- and Z-axes. Depending on the configuration, X-, Y- and Z-axes moving bodies, X-, Y- and Z-axes guides, X-, Y- and Z-axes feeding drives and a chip remover are appropriately arranged.

In a machine tool of Patent Document 1, the respective moving bodies movable in X-, Y- and Z-axes directions are disposed on a rear face of a base. A feeding mechanism for vertically moving a body along guide rails is disposed over the base. This feeding mechanism includes a pair of parallel ball screws providing vertical feed screws and a pair of feed motors for rotationally driving the ball screws separately.

Patent Document 1: Japanese Unexamined Patent Publication No. 2007-75926

SUMMARY OF THE INVENTION

In the machine tool of Patent Document 1, the base defines a discharge hole extending from the front face to the rear face of the base, and therefore the feed screws are disposed above the base. Further, feed motors must be attached to the top ends of the ball screws because a space must be secured above the base for the movement of the vertically moving body. Accordingly, the gravity center of the machine tool becomes higher, because the relatively heavy feed motors are disposed at a point higher than the tool, and the guide rails for the vertically moving body are disposed above the discharge hole. As a result, the stability of the machine tool is degraded and the over-all height and the volume of the machine tool are increased.

The invention is directed to solve the above-described problems of the prior art, and the objective of the invention is to provide a compact machine tool which has gravity center set to a lower point compared with the prior art so as to increase the stability of the machine tool, and which also ensures the discharge of chips.

In order to solve the above-described problem, according to the invention, there is provide a machine tool for machine a workpiece, which is attached to a table, by moving a tool attached to a spindle and the workpiece relative to each other, comprising:

a bed providing a base and defining a top to which a table is disposed;

a chip removing duct, extending rearwardly from a chip discharge outlet defined in a rear side of the bed at the center in the left-right direction, for discharging chips outside the machine tool from the inside of the bed;

a vertically moving body in the form of a bifurcated fork over the chip removing duct, mounted to the rear side of the bed for vertical movement along a pair of vertically extending guides mounted to the rear side of the bed at the respective left and right sides of the chip removing duct or to the rear lateral sides of the bed; and vertically driving means for moving the vertically moving body along the vertically extending guides.

According to the invention, the arrangement of the chip removing duct, extending rearwardly from a chip discharge outlet defined in the a rear side of the bed at the center in the left-right direction, for discharging chips outside the machining tool from the inside of the bed, and the vertically moving body, mounted to the rear side of the bed for vertical movement along the pair of vertically extending guides mounted to the rear side of the bed at the respective left and right sides of the chip removing duct or to the rear lateral sides of the bed enables larger sectional areas of the discharge outlet and the chip removing duct so as to ensure the discharge of the chips and the machining liquid effectively by positioning the chip removing duct at the center of the rear side of the bed in the left-right direction. Further, by disposing portions of the bifurcated legs of the vertically moving body so as to overlap with the vertical guides extending to lower points at the left and right sides of the chip discharging duct, the gravity center of the machine tool can be lowered, and the vertically moving body is supported with relatively long vertical span, whereby higher stability of the machine tool than ever before is realized without enlarging the machine tool.

DETAILED DESCRIPTION OF THE INVENTION

Figure 1:
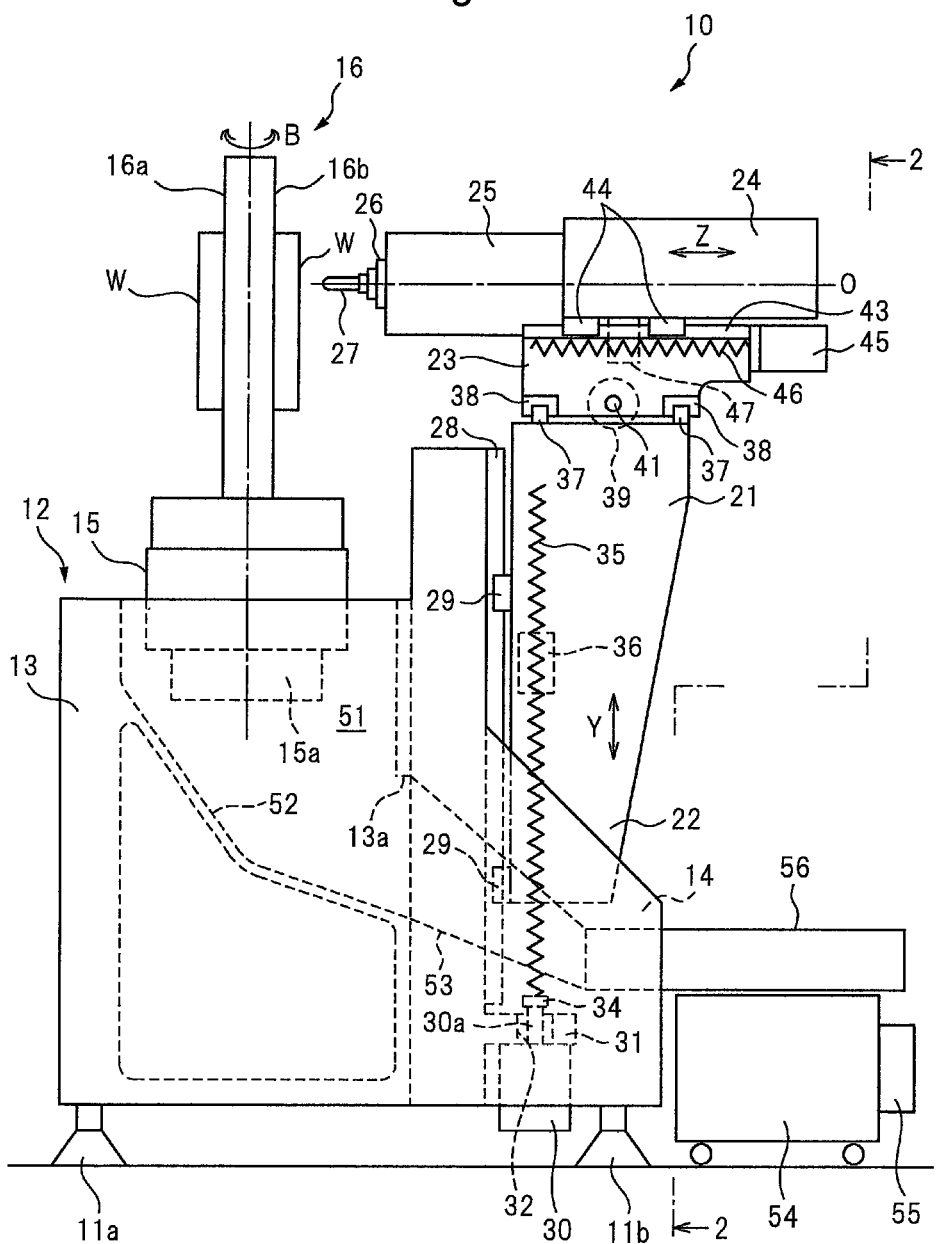
FIG. 1 is a side view schematically showing the configuration of a machine tool according to an embodiment of the invention.
Figure 2:
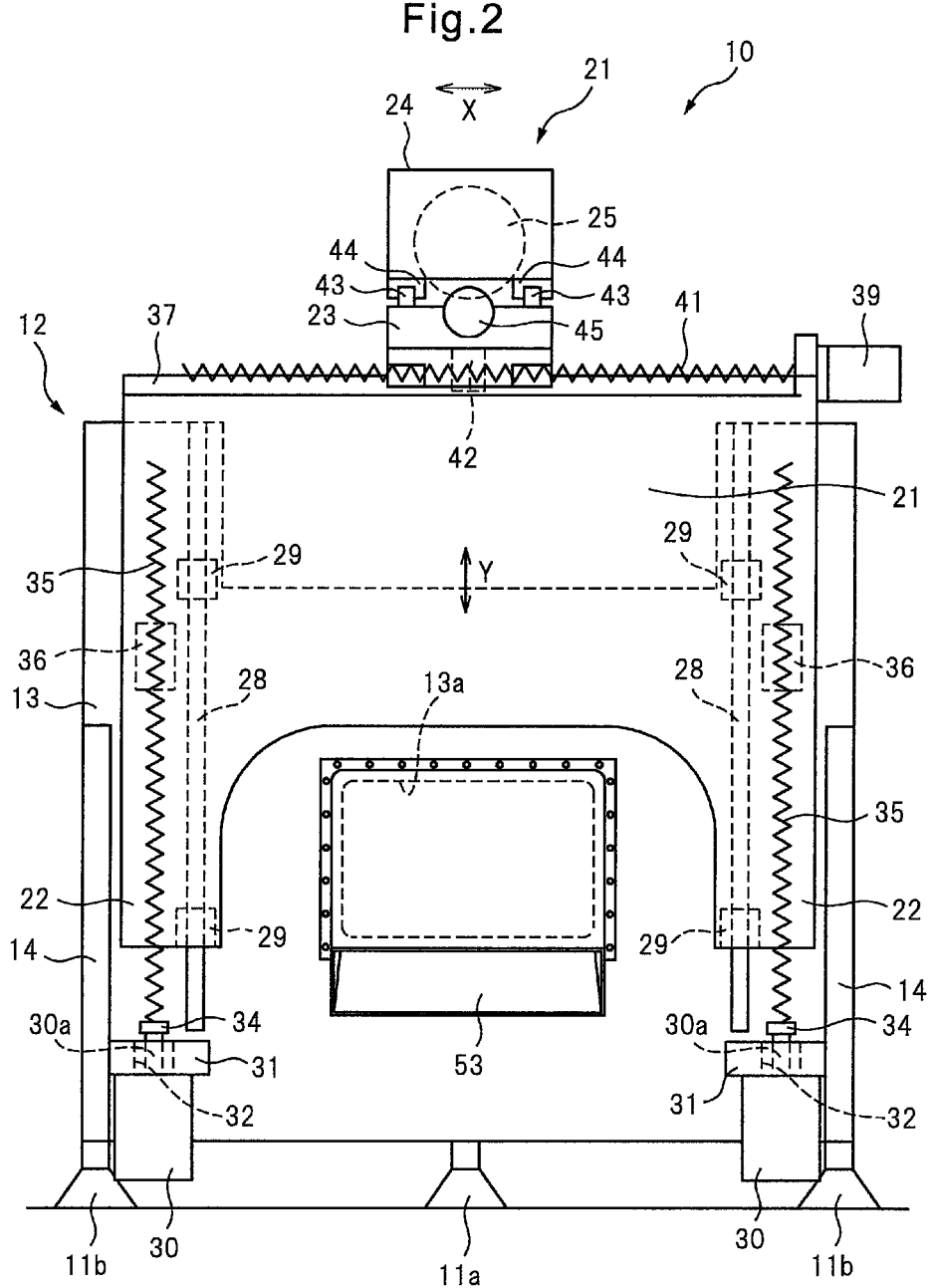
FIG. 2 is a rear view of the machine tool in the direction of arrows 2-2 in FIG. 1.
Figure 3:
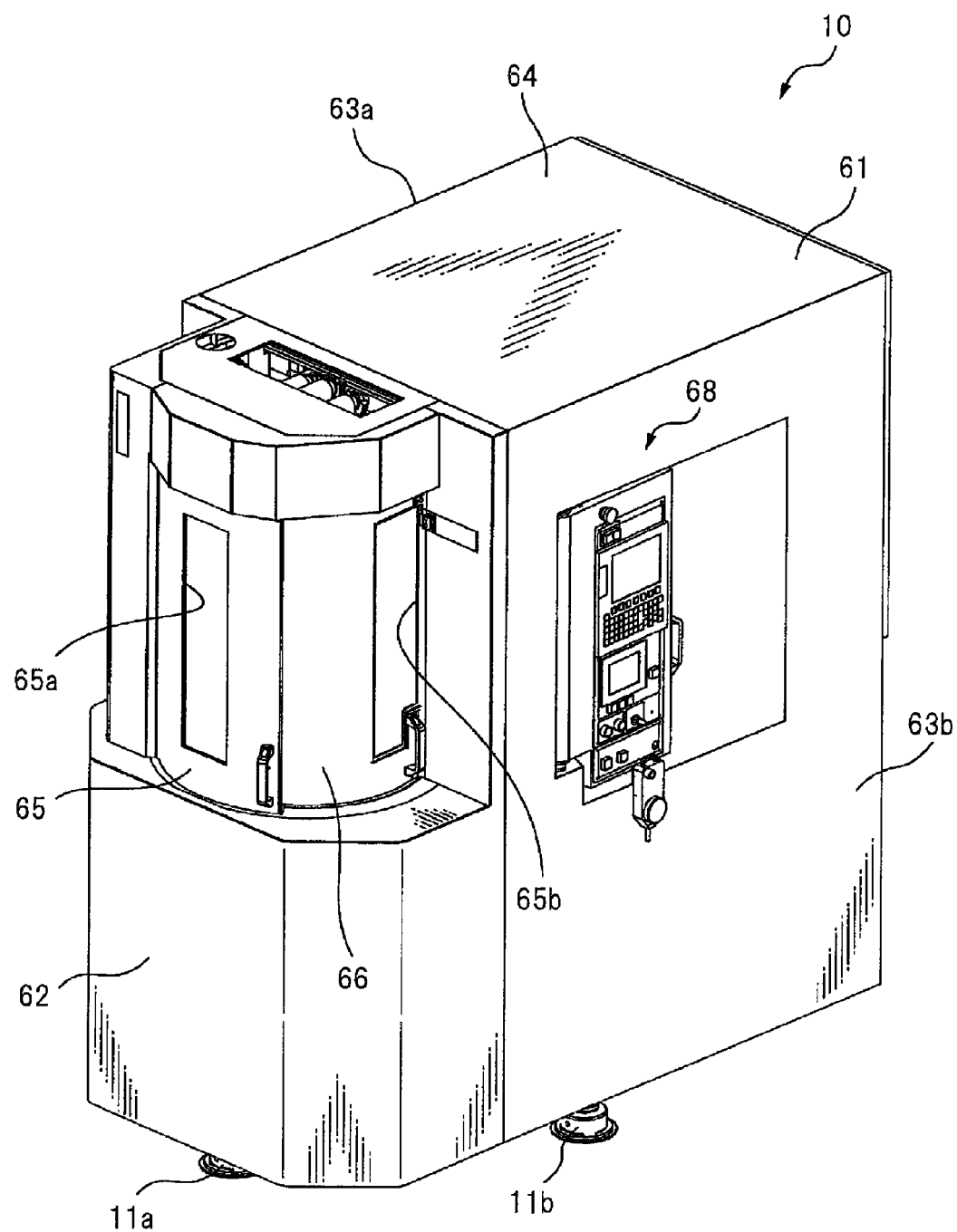
FIG. 3 is a perspective view of the exterior of the machine tool with a splashguard enclosing the machine tool.

With reference to the drawings, an embodiment of the invention will be described below. FIG. 1 is a side view schematically showing the structure of a machine tool according to an embodiment of the invention. FIG. 2 is a rear view of the machine tool viewing in the direction of arrows 2-2 in FIG. 1. FIG. 3 is a perspective view schematically showing the exterior of the machine tool with a splashguard. In this specification, a front side of the machine tool is defined by the direction of the tip of a tool attached to the end of a spindle as described below.

In this embodiment, as an example, a machine tool 10 may be a four-axis horizontal machining center having liner feed axes extending in three orthogonal X-, Y- and Z-axes directions and a B-axis providing a rotary feed axis. The left-right direction (perpendicular to the plane of FIG. 1) of the machine tool 10 is defined as the X-axis, the vertical direction is defined as the Y-axis, and the front-rear direction (the left-right direction in FIG. 1) is defined as the Z-axis. The B-axis is a rotary feed axis about a vertical axis parallel to the Y-axis. The machine tool 10 may be, instead of a four-axis horizontal type, for example, a five-axis machine, a vertical type machining center, a milling machine, an electric discharge machine, etc.

The machine tool 10 comprises a bed 12 providing a base supported on a floor of a factory. The bed 12 comprises a bed body 13 in the form of a hollow substantially rectangular column and a pair of side walls 14 rearwardly extending in Z-axis direction from a rear face of the bed body 13. The bed 12 is supported by a plurality of, in this embodiment three height-adjustable leveling blocks as supporting members. In particular, the bed 12 is supported by a front leveling block 11a, disposed at the front side center of the bed body 13, and rear leveling blocks 11b disposed at the respective rear ends of the pair of side walls 14.

On the top surface of the bed body 13, a table 15 is arranged. The table 15 is driven by a B-axis servomotor 15a, incorporated in the bed body 13 to rotate about an rotational axis, i.e., B-rotary feed axis, parallel to the Y-axis. On the table 15, a double-faced workpiece mount 16 is fastened. The double-faced workpiece mount 16 includes oppositely defined mounting faces 16a and 16 for mounting workpiece W.

The machine tool 10 comprises a vertically moving body 21 disposed for linear reciprocal movement in the vertical direction along the Y-axis at the back of the bed body 13. At the top of the vertically moving body 21, a left-right moving body 23 is mounted for liner reciprocal movement in the left-right direction along the X-axis. A front-rear moving body 24 is mounted to the left-right moving body 23 for liner reciprocal movement in the front-rear direction along the Z-axis. Mounted to the front-rear moving body 24 is a spindle head 25 for supporting a spindle 26 for rotation about a rotational axis O parallel to the Z-axis. A tool 27 is detachably attached to the end of the spindle 26 so as to face the workpiece W mounted to one of the double-faced workpiece mount 16.

Mounted to the rear side of the bed body 13 are Y-axis guide rails 28, providing a pair of left-right guides extending in the Y-axis direction (vertical direction), and Y-axis ball screws 35, providing a pair of vertical feed screws, disposed outside the Y-axis guide rails 28 so as to extend in the Y-axis direction. Further, brackets 31 are disposed in the rear side of the bed body 13. In this embodiment, the brackets 31 are integrally formed with the side walls 14 so as to extend from the inner side surfaces of the side walls 14. Y-axis servomotors 30, as vertical feed motors, are mounted to the brackets 31. Brackets 31 define through holes 32 extending in the Y-axis direction from the top surface to the bottom surface, wherein the Y-axis servomotors 30 are mounted to the bottom surfaces of the brackets 31 so that their output shafts 30a extends upwardly through the respective through holes 32. The output shafts 30a are connected to the lower ends of the Y-axis ball screws 35 by couplings 34. Y-axis ball screws 35 are disposed as possible as near the rear leveling blocks 11b.

The vertically moving body 21 comprises a pair of left-right legs 22 which are apart from each other or formed into a bifurcated fork downwardly extending in the Y-axis direction. Y-axis guide blocks 29 are mounted to the vertically moving body 21. The vertically moving body 21 is supported on the Y-axis guide rails 28 through the Y-axis guide blocks 29 for sliding along the Y-axis guide rails 28. As shown in FIG. 2, the Y-axis guide blocks 29 are position so that the Y-axis guide rails 28 are overlapped by the pair of legs 22 when the vertically moving body 21 is mounted to the rear side of the bed body 13. In particular, the vertically moving body 21 is provided with a pair of top and bottom Y-axis guide blocks 29 for each of the pair of Y-axis guide rails 28 whereby at least one of the Y-axis guide blocks 29 of each of the pairs is always disposed on each of the pair of legs 22.

Further, mounted to the vertically moving body 21 are nuts 36 for engaging the Y-axis screws 36. When the Y-axis servomotors 30 are rotated, the vertically moving body 21 is vertically driven in accordance with the direction and the amount of the rotation of the Y-axis servomotors 30. In this connection, the Y-axis servomotors 30 and the Y-axis ball screws 35 provide vertically moving means of the invention. Provision of at least one of the Y-axis ball screws 35 may be sufficient. The left-right size of the vertically moving body 21 may be a minimum length allowing the vertically moving body to accommodate the guide blocks 29 whereby the vertically moving body may have laterally extending portions for mounting the nuts 36 to reduce its weight.

Mounted to the top of the vertically moving body 21 are X-axis guide rails 37, providing a pair of left-right guides extending in the X-axis direction, and an X-axis ball screw 41, providing a left-right feed screw disposed between the pair of the X-axis guide rails 37 so as to extend in the X-axis direction. X-axis guide blocks 38 are mounted to the left-right moving body 23. The left-right moving body 23 is supported on the X-axis guide rails 37 through the X-axis guide blocks 38 for sliding along the X-axis guide rails 37 in the left-right direction. An X-axis servomotor 39 is mounted to the vertically moving body 21 as a left-right feed motor. Output shaft (not shown) of the X-axis servomotor 39 is connected to the X-axis ball screw 41 by a coupling (not shown). A nut 42, engaging the X-axis ball screws 41, is mounted to the left-right moving body 23 whereby when the X-axis servomotor 39 is rotated, the left-right moving body 23 is driven in the left-right direction in accordance with the direction and the amount of the rotation of the X-axis servomotor 39. The X-axis servomotor 39 and the X-axis ball screw 41 provide left-right driving means of the invention.

Mounted to the top of the left-right moving body 23 are Z-axis guide rails 43, providing a pair of front-rear guides extending in the Z-axis direction, and a Z-axis ball screw 46, providing a front-rear feed screw disposed between the pair of the Z-axis guide rails 43 so as to extend in the Z-axis direction. Z-axis guide blocks 44 are mounted to the front-rear moving body 24. The front-rear moving body 24 is supported on the Z-axis guide rails 43 through the Z-axis guide blocks 44 for sliding along the Z-axis guide rails 43 in the front-rear direction. A Z-axis servomotor 45 is mounted to the left-right moving body 23 as a front-rear feed motor. An output shaft (not shown) of the Z-axis servomotor 45 is connected to the Z-axis ball screw 46 by a coupling (not shown). Nuts 42, engaging the Z-axis ball screw 46, is mounted to the front-rear moving body 24 whereby when the Z-axis servomotor 45 is rotated, the front-rear moving body 24 is driven in the front-rear direction in accordance with the direction and the amount of the rotation of the Z-axis servomotor 45. The Z-axis servomotor 45 and the Z-axis ball screw 46 provide front-rear driving means of the invention.

A built-in type spindle motor (not shown) is incorporated in the spindle head 25. The spindle 26 and tool 27 are rotationally driven by the spindle motor about the rotational axis O. The tool 27 is moved relative to the workpiece W by the linear motion of the left-right moving body 23, the vertically moving body 21 and the front-rear moving body 24 in the X-, Y- and Z-axes directions. The relative movement is controlled by an NC device (not shown) incorporated in the machine tool 10. The rotating tool 27 contact the workpiece W at a machining point when the tool 27 and the workpiece W move relative to each other. Accordingly, the workpiece is machined into a desired shape.

As shown in FIG. 1, the bed body 13 defines an upwardly opening cavity 51. A chute 52 is defined in the inner wall of the cavity 51 under the table 15. The rear side of the bed body 13 defines an opening 13a as an outlet for chips. The chute 52 is defined by a slope lowering from the front side of the bed body 13 rearwardly toward the opening 13a and downwardly inclined surfaces defined by the left and right inner walls. The chips generated during the machining of the workpiece W and the machining liquid injected to machining areas in the workpiece W will fall from around the table 15 into the cavity 51, then move toward the opening 13a along the chute 52.

A chip removing duct 53, for removing the chips and the machining liquid outside the machine tool, i.e., outside the cavity 51 of the bed body 13, is mounted to the rear side of the bed body 13. The chip removing duct 53 extends rearwardly from the rear side of the bed body 13 to pass between the legs 22 of the vertically moving body 21. The chip removing duct 53 is mounted at one end thereof to the rear side of the bed body 13 by for example screw bolts so as to enclose the opening 13a. The other end 53b of the duct 53 is configured to be connected to a chip receptacle 56. The chip receptacle 56 is a member in the form of an upwardly opening shallow tray having a meshed bottom wall (now shown). A machining liquid reservoir 54 is placed under the chip receptacle 56. The chip removing duct 53 is downwardly inclined, i.e., closing the floor, from the chute 52 toward the machining liquid reservoir 54. Thus, the chips and the machining liquid, discharged outside the machine tool through the opening 13a, are directed to the chip receptacle 56 by the chip removing duct 53. In the chip receptacle 56, the machining liquid will fall into the machining liquid reservoir 54 after it is filtered by the meshed bottom wall of the chip receptacle 56 whereby only the chips are deposited on the bottom wall of the chip receptacle 56. The chips remaining in the chip receptacle 56 will be periodically collected by an operator.

The machining liquid reservoir 54 contains the machining liquid from the chute 52 through chip removing duct 53. A pump 55 is mounted to the machining liquid reservoir 54. The pump 55 directs the machining liquid, contained in the machining reservoir 54, to the machining areas in the workpiece W. A filter (not shown) may be provided in the machining liquid reservoir 54 in order to further remove fine chips before the supply to the machining areas. Thus, the machining liquid is reused.

The machine tool 10 is provided with a splashguard 61 in the form of for example a box containing all of the above-described components. The splashguard 61 includes a front panel 62, left and right side panels 63a and 63b and a top panel 64, respectively covering a front lower part, the sides and the top and rear side of the machine tool 10. A front upper part of the machine tool 10, in particular the space where the double-faced workpiece mount 16 is disposed, is covered by slid doors 65 and 66. The slide doors 65 and 66 includes rectangular monitoring windows 65a and 66a. Transparent glass plates are fitted in the monitoring windows.

A control panel 68 is incorporated in the right side panel 63b. The control panel 68 is connected to the above-described NC device. In the control panel 68, a display panel, displaying the operation states of the above-described components, and a various input buttons are disposed. An operator of the machine tool 10 can input a machining program and a various machining parameters to the NC device through the control panel 68. A machining program may be input through a communication network, such as a LAN in a factory.

As described above, in the machine tool 10 according to the embodiment, the pair of vertically extending left-right Y-axis guide rails 28 are disposed adjacent the either sides of the bed body 13 in the rear side of the bed body 13, and the vertically moving body 21, having the pair of downwardly extending legs 22 in the form of a bifurcated fork, is mounted to the bed 13 for vertical movement along the pair of left-right Y-axis guide rails 28. The pair of left-right vertically extending Y-axis ball screws 35 are disposed, as a vertically driving means for vertically driving the vertically moving body 21, parallel to each other adjacent the pair of left-right Y-axis guide rails 28, and the vertically moving body 21 is provided with the nuts 36 engaging the Y-axis ball screws 35. The pair of left-right Y-axis guide rails 28 are positioned so as to be overlapped by the pair of downwardly extending legs 22 in the form of a bifurcated fork, when the vertically moving body 21 is mounted to the rear side of the bed body 13. The arrangement of the legs 22 in the form of a bifurcated fork, the Y-axis guide rails 28 and the Y-axis ball screws 35 allows the chip removing duct 53, for discharging the chips and the machining liquid outside the machine, to be positioned at the center of the rear side of the bed 13 in the left-right direction and to extend rearward from the rear side of the bed body 13 between the bifurcated legs 22 of the vertically moving body 21. This enables the larger sectional areas of the opening 13 as a discharge outlet and the chip removing duct 53, ensuring the discharge of the chips and the machining liquid effectively.

Further, in the machine tool 10 according to the embodiment, the pair of left-right Y-axis ball screws 35 are disposed parallel to and adjacent to the pair of left-right Y-axis guide rails 28, and the Y-axis servomotors 30 are connected to the lower end of the Y-axis ball screws 35. The Y-axis servomotors 30 are mounted to the brackets 31, and the brackets 31 are integrally formed with the side walls 14 so as to extend from the inner surface of the side walls 14. In the side walls 14, adjacent the brackets 31, i.e., adjacent the Y-axis servomotors 30, the leveling blocks 11b, for supporting the rear part of the machine tool 10, are disposed. In this manner, the disposition of the Y-axis ball screws 35, for vertically driving the vertically moving body 21 which is the heaviest moving body of the machine tool 10, adjacent the rear leveling blocks 11b increases the over-all rigidity of the machine tool 10, enabling high speed and high accuracy motion of the vertically moving body 21.

Further, the Y-axis servomotors 30 and the Y-axis ball screws 35 are disposed rear side of the bed body 13, and the Y-axis servomotors 30 are connected to the lower ends of the Y-axis ball screws 35. In the embodiment, the Y-axis guide rails 28, the Y-axis servomotors 30 and the Y-axis ball screws 35 are disposed below the spindle head 25. In particular, the Y-axis guide rails 28 extend so that their lower ends are positioned near the floor, and the servomotors 30 are also disposed adjacent the floor. As a result, the gravity center of the machine tool 10 can be lowered compared with conventional machine tools. Furthermore, higher stability of the machine tool 10 than ever before is realized by forming the vertically moving body 21 to have the bifurcated legs 22, which accommodate the chip removing duct 53, and by disposing guide blocks 29 to the legs 22 so as to support and guide the vertically moving body 21 with relatively long vertical span. Accordingly, the machining accuracy of the machine tool 10 can be increased. Further, the over-all height of the machine tool 10 can be reduced because the Y-axis servomotors 30 must not be disposed on the top of the machine tool 10.

The vertically moving body 21 may be configured to slide vertically along a pair of Y-axis guide rails 28 which may be disposed to extend vertically along the rear lateral sides of the bed body 13, instead of the rear side of the bed body 13.

REFERENCE SIGNS LIST

10 Machine Tool
11a Front Leveling Block
11b Rear Leveling Block
12 Bed
13a Opening
14 Side Wall
15 Table
21 Vertically Moving Body
22 Leg
23 Left-Right Moving Body
24 Font-Rear Moving Body
25 Spindle Head
26 Spindle
27 Tool
28 Y-axis Guide Rail
29 Y-axis Guide Block
30 Y-axis Servomotor
35 Y-axis Ball Screw
36 Nut
37 X-axis Guide Rail
43 Z-axis Guide Rail
52 Chute
53 Chip Removing Duct
54 Machining Liquid Reservoir
56 Chip Receptacle

The invention claimed is:

1. A machine tool for machining a workpiece, which is attached to a table, by moving a tool attached to a spindle and the workpiece relative to each other, characterized in that the machine tool comprises:
   a bed providing a base and defining a top to which a table is disposed;
   a chip removing duct, extending rearwardly from a chip discharge outlet defined in a rear side of the bed at the center in the left-right direction, for discharging chips outside the machine tool from the inside of the bed;
   a vertically moving body in the form of a bifurcated fork over the chip removing duct, mounted to the rear side of the bed for vertical movement along a pair of vertically extending guides mounted to the rear side of the bed at the respective left and right sides of the chip removing duct or to the rear lateral sides of the bed; and
   vertically driving means for moving the vertically moving body along the vertically extending guides.

2. A machine tool according to claim 1, wherein
   the vertically moving body defines a pair of downwardly extending legs in the form of the bifurcated fork;
   the pair of left-right vertically extending guides are disposed to be overlapped by the pair of downwardly extending legs in the form of a bifurcated fork when the vertically moving body is mounted to the rear side of the bed.

3. A machine tool according to claim 1, wherein the vertically driving means comprises a pair of left-right feed screws extending parallel to the pair of left-right vertically extending guides.

4. A machine tool according to claim 1, wherein the bed has a chute, defined under the table, for receiving the chips and the machining liquid, and a chip discharging outlet, defined in the rear side of the bed, whereby the chips and the machining liquid are discharged to the chip removing duct from the chute through the chip discharging outlet.

* * * * *